United States Patent

Miller et al.

[11] Patent Number: 5,918,064
[45] Date of Patent: Jun. 29, 1999

[54] DATA PROCESSING SYSTEM HAVING AN INPUT/OUTPUT COPROCESSOR WITH A SEPARATE VISIBILITY BUS

[75] Inventors: Gary Lynn Miller, Round Rock; Vernon Bernard Goler, Austin, both of Tex.

[73] Assignee: Motorola Inc., Austin, Tex.

[21] Appl. No.: 08/801,284

[22] Filed: Feb. 18, 1997

[51] Int. Cl.[6] .................................................. G06F 9/00
[52] U.S. Cl. ..................................... 395/800.38; 395/308
[58] Field of Search .................... 395/800.32, 800.34, 395/306, 309, 585, 800.38, 308

[56] References Cited

U.S. PATENT DOCUMENTS

| | | | |
|---|---|---|---|
| 4,542,453 | 9/1985 | Patrick et al. | 364/200 |
| 5,410,545 | 4/1995 | Porter et al. | 371/21.6 |
| 5,734,881 | 3/1998 | White et al. | 395/585 |

OTHER PUBLICATIONS

Dawdy, Mike, A more accurate timing tool, Windows Developer's Journal, Aug. 1996 p. 14, paragraph 16.

*Primary Examiner*—Ellis B. Ramirez
*Assistant Examiner*—William Titcomb
*Attorney, Agent, or Firm*—Daniel D. Hill

[57] ABSTRACT

A data processing system includes a central processing unit (CPU) (20), a peripheral bus (32), and an input/output (I/O) coprocessor (38). The CPU (20) and the I/O coprocessor (38) are coupled to the peripheral bus (32). The I/O coprocessor (38) has a plurality of front-end channels (50) for receiving a time-base, and in response, for providing a time-base reference for input signals and generating output signals using the time-base reference. A back-end processor (80) controls operation of the plurality of front-end channels (50) in response to executing instructions. A visibility bus (40), coupled to the back-end processor (80), is for providing visibility of the internal registers of the back-end processor (80) independent of the CPU (20). The visibility is provided for development of the instructions executed by the back-end processor (80).

21 Claims, 3 Drawing Sheets

DATA PROCESSING SYSTEM HAVING AN INPUT/OUTPUT COPROCESSOR WITH A SEPARATE VISIBILITY BUS

REFERENCE TO RELATED APPLICATIONS

The present application is related to the following U.S. patent applications:

"INTEGRATED CIRCUIT INPUT-OUTPUT PROCESSOR HAVING IMPROVED TIMER CAPABILITY", invented by Vernon B. Goler et al., Ser. No. 08/555,456, filed on Nov. 13, 1995, and assigned to the assignee hereof;

"TIMER BUS STRUCTURE FOR AN INTEGRATED CIRCUIT", invented by Vernon B. Goler et al., Ser. No. 08/555,454, filed on, and assigned to the assignee hereof;

"DATA TRANSFER BETWEEN INTEGRATED CIRCUIT TIMER CHANNELS", invented by Gary L. Miller et al., Ser. No. 08/555,963, filed on Nov. 13, 1995, and assigned to the assignee hereof;

"PIN AND STATUS BUS STRUCTURE FOR AN INTEGRATED CIRCUIT", invented by Gary L. Miller et al., Ser. No. 08/555,961, filed on Nov. 13, 1995, and assigned to the assignee hereof;

"SIGNAL/CONDITION BROADCAST FEATURE OF AN INTEGRATED CIRCUIT TIMER", invented by Gary L. Miller et al., Ser. No. 08/555,964, filed on Nov. 13, 1995, and assigned to the assignee hereof;

"PERFORMING FLEXIBLE LOGICAL OPERATIONS WITH TIMER CHANNEL OUTPUTS", invented by Gary L. Miller et al., Ser. No. 08/555,455, filed on Nov. 13, 1995, and assigned to the assignee hereof;

"TIMEBASE SYNCHRONIZATION IN SEPARATE INTEGRATED CIRCUITS OR SEPARATE MODULES", invented by Rudolf Bettelheim et al., Ser. No. 08/555,965, filed on Nov. 13, 1995, and assigned to the assignee hereof; and "FLEXIBLE CONFIGURATION OF TIMEBASES IN A TIMER SYSTEM", invented by Gary L. Miller et al., Ser. No. 08/555,474, filed on Nov. 13, 1995, and assigned to the assignee hereof.

FIELD OF THE INVENTION

The present invention relates in general to input/output (I/O) processors, and more particularly to an I/O processor having a visibility bus to provide visibility to signals from I/O Signal Processing modules.

BACKGROUND OF THE INVENTION

Data processing systems used for complex real-time control systems, for example, automotive and robotics control systems, are requiring finer control, faster system response, and more I/O capability. As a result, the need for more, faster, and improved I/O processing by the data processing system has grown significantly. Microcomputers are expected to provide higher resolution outputs, both digital and analog, for more accurate control. For higher frequency control functions, a central processing unit (CPU) of a data processing system may not be capable of responding at the rate needed, due to processing overhead. A solution is needed which provides more, faster, and improved I/O processing capability without overburdening the CPU.

In addition, microcomputers are required to be very flexible in order to accommodate a wide variety of applications. In microcomputers of the past, flexibility in I/O processing has been provided through CPU software which operates on ports or simple timer channels. Analog and digital I/O were linked through CPU software as well. However, I/O bandwidth was sacrificed primarily due to system overhead since the CPU was involved in all I/O processing. Thus, a solution is needed which provides both flexibility and increased I/O capability.

DETAILED DESCRIPTION OF THE DRAWINGS

Figure 1:
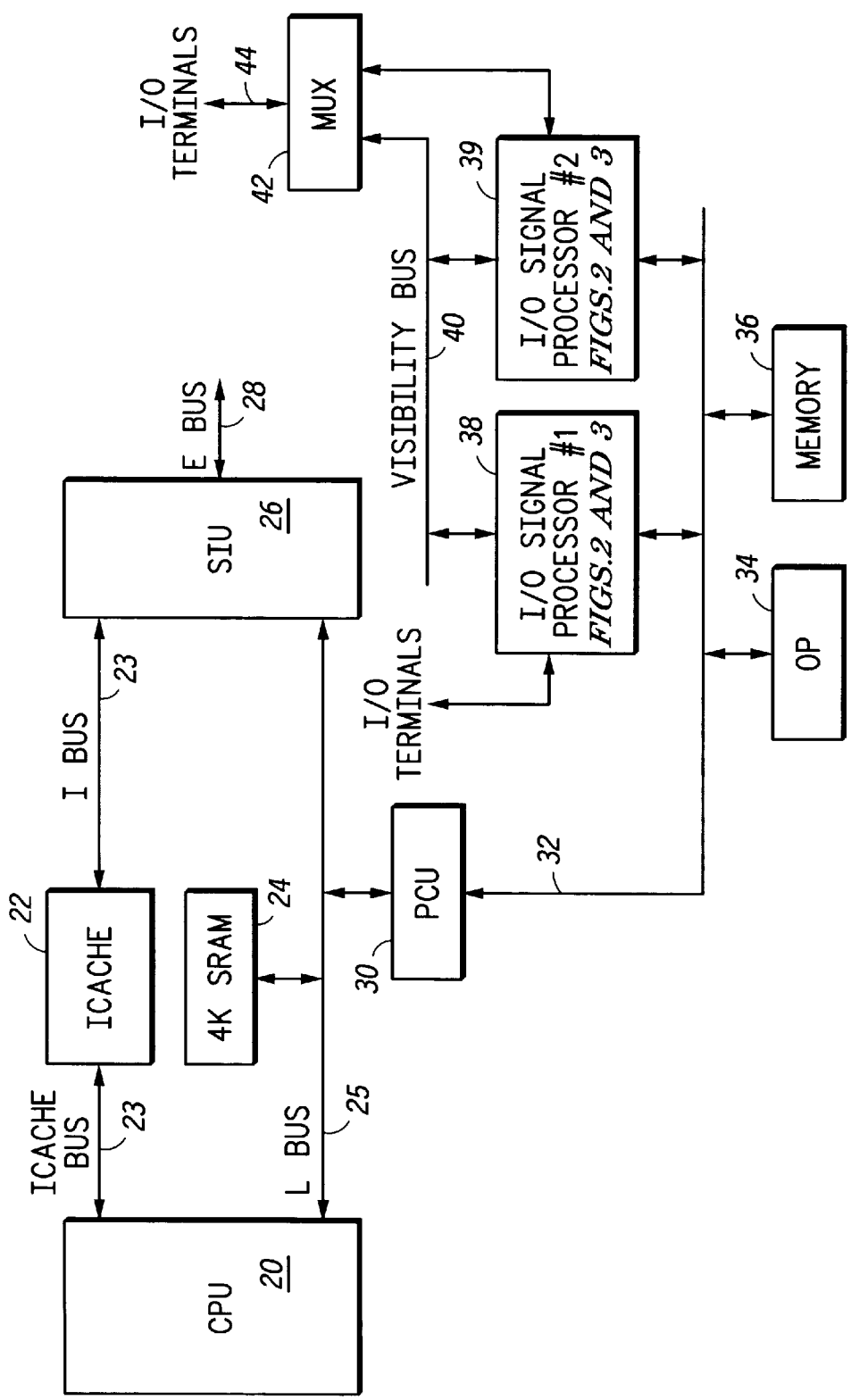
FIG. 1 is a block diagram that illustrates a data processing system in accordance with the present invention.

Generally, the present invention provides a data processing system having a central processing unit (CPU), a peripheral bus, and an input/output (I/O) coprocessor. The CPU and the I/O coprocessor are coupled to the peripheral bus. The I/O coprocessor has a plurality of front-end channels for receiving a time-base, and in response, for providing a time-base reference for input signals and generating output signals using the time-base reference. A back-end processor controls operation of the plurality of front-end channels in response to executing instructions. A separate visibility bus is coupled to the back-end processor, for providing visibility of the internal registers of the back-end processor independent of the CPU. The visibility is provided for development of the instructions executed by the back-end processor.

The term "bus" will be used to refer to a plurality of signals or conductors which may be used to transfer one or more various types of information, such as data, addresses, control, or status. Although the terms "integrated circuit pin" and "pin" are used throughout this document, these terms are intended to encompass any type of apparatus which allows electrical signals to be transferred to or from an integrated circuit, such as, for example, integrated circuit bonding pads, solder bumps, wire conductors, etc.

In the following description, numerous specific details are set forth to provide a thorough understanding of the present invention. However, it will be obvious to those skilled in the art that the present invention may be practiced without such specific details. In other instances, circuitry has been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 is a block diagram that illustrates a data processing system in accordance with the present invention. It contains a CPU 20 coupled with an instruction cache (ICACHE) 22 via an ICACHE bus 23. ICACHE 22 typically comprises high speed static random access memory (SRAM) and stores instructions to be executed by CPU 20. CPU 20 is also coupled to an L Bus 25. L Bus 25 is used for memory loads and stores. There is a second area of static ram (SRAM) 24 coupled to the CPU 20 by the L Bus 25 that is used primarily as a data stack. Also connected to the I-bus 23 and the L Bus 25 is a systems integration unit (SIU) 26. The SIU 26 provides an interface to an external bus (E-bus) 28 which is the interface in the data processing system to the external world.

A peripheral bus controller (PCU) 30 couples the L bus 25 to an Inter-Module bus, or peripheral bus, (IMB) 32. Shown coupled to the IMB 32 are two IOSPs 38 and 39, memory 36, and other peripherals (OP) 34. The IOSPs 38 and 39 are coupled to a Visibility Bus 40 and a multiplexer (MUX) 42. Output signals from the Visibility Bus 40 and I/O signals from the IOSPs 38 and 39 are provided to output terminals 44 via MUX 42. IMB 32 is coupled between the plurality of front-end channels 50 and the back-end processor 80, for allowing the central processing unit direct access to the front-end channels.

Input/Output Signal Processors (IOSPs) (see IOSPs 38 and 39 in FIG. 1) provide both flexibility and increased I/O capability to data processing systems. In one embodiment of the present invention, one or more IOSPs 38 and 39 are coprocessors located on a single integrated circuit that includes a central processing unit (CPU) 20. The one or more IOSPs 38 and 39 communicate with the CPU 20 by way of L BUS 25.

Each IOSP 38 and 39 is designed using a modular architecture. At the highest level, each one of IOSPs 38 and 39 is a module which can communicate with other modules by way of an inter-module bus 32. For example, in one embodiment, each of IOSPs 38 and 39 may be a module which is capable of being used with the MC68HC300 family of microcomputers, available from Motorola, Inc. of Austin, Tex..

In addition to being a module itself, each one of IOSPs 38 and 39 is also made up of sub-modules, or modular I/O channels. Different IOSP 38 and 39 versions can be easily created by combining modular channels from a "silicon library of channels" in any combination. Channels may have different hardware, including digital or analog I/O capability, to accomplish specific operations. To allow a growth path for unanticipated I/O functions, new channels can be added to the library. Thus different arrangements of the modular channels can be combined in order to form different versions of IOSPs 38 and 39.

An important feature of IOSPs 38 and 39 is that the architecture allows the user to partition tasks between software and hardware. Front-end channels 50 (FIG. 2) can be programmed to operate together, in hardware, to accomplish simple high frequency functions. Channels operating in concert essentially act as a pre-processor to accommodate high frequency I/O events. This is essential in providing finer control and faster system response by relieving a back-end processor 80 (see FIG. 3) of the software servicing of all I/O events, or requiring the CPU 20 and back-end processor 80 to only perform the software servicing of lower frequency I/O events.

The front-end channels of each IOSPs 38 and 39 are flexible in both the number and characteristics of I/O functions which they can perform. The architecture for the plurality of front-end channels 50 provides this flexibility because it is modular with respect to the number of pins, channels, and buses. That is, different front-end versions can be easily created from a "silicon library of channels", and integrated circuit pins can also be added, independent of the number of channels. The architecture of front-end channels 50 also supports adding more buses for data and control when the number of channels is increased in various IOSP versions. New channels can also be designed and added to the library, to provide a growth path for future I/O functions.

A second important aspect of the architecture of front-end channels 50 is that channels can be programmed to operate together, in hardware, to accomplish simple high frequency functions. Allowing the user to partition tasks between software and hardware is important in maximizing system throughput by reducing the number of CPU interrupts in the system.

Figure 2:
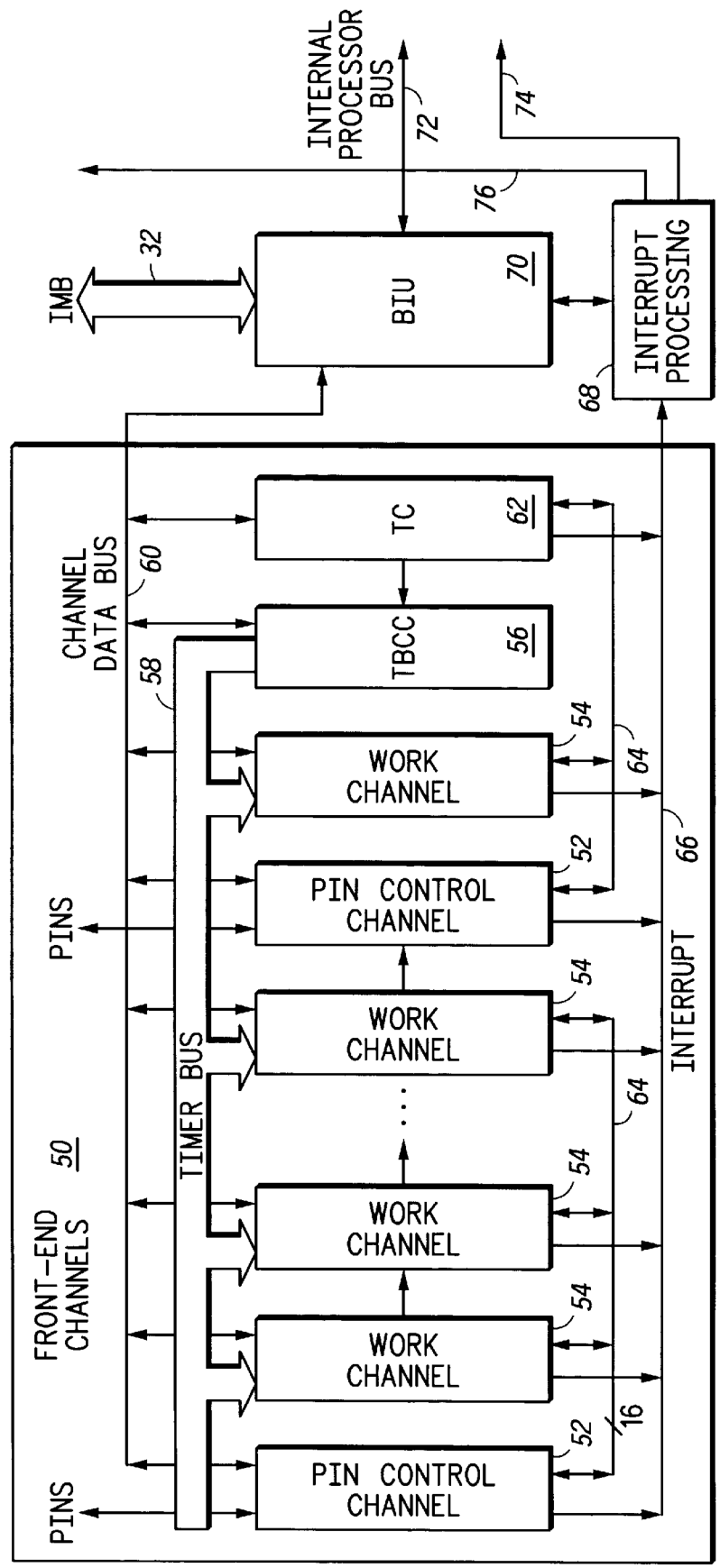
FIGS. 2 and 3 together are a block diagram that illustrates an I/O Signal Processor from FIG. 1.
Figure 3:
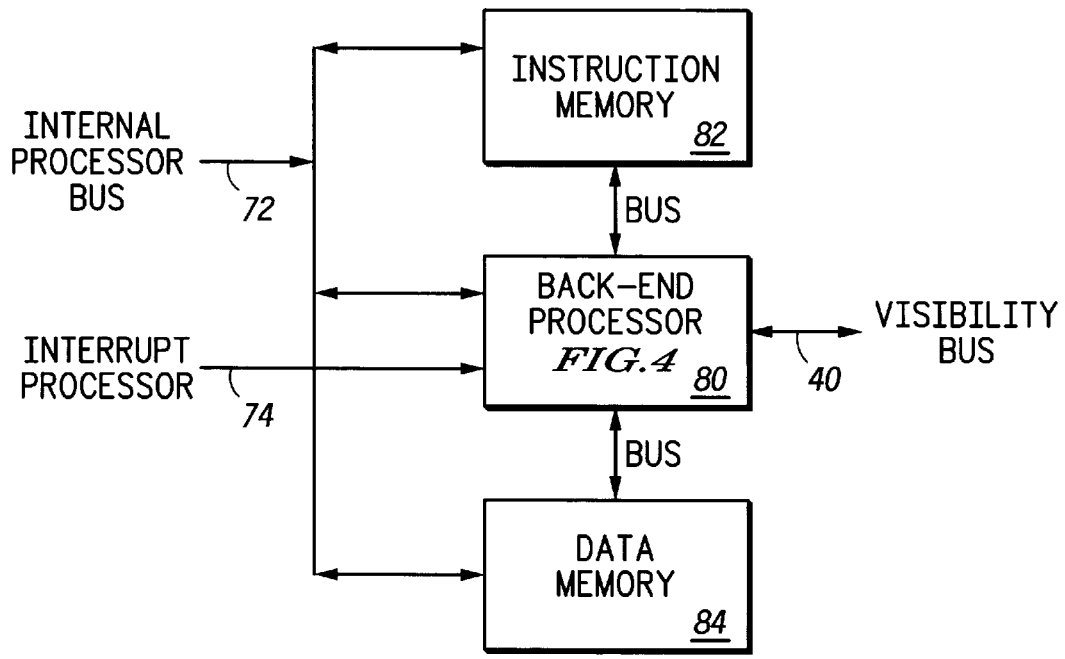

FIGS. 2 and 3 together are a block diagram that illustrates an I/O Signal Processor 38 and 39 that includes the front end channels 50 and a back-end processor 80. FIG. 2 illustrates a plurality of front-end channels 50. The plurality of front-end channels 50 having a plurality of input/output terminals coupled to the timer bus 58 and may receive a time-base value. In the illustrated embodiment, some of front-end channels 50 receive the time-base value and some do not. The front-end channels 50 that receive the time-base value use the time-base value for providing a timer function. In response to receiving the time-base value, the front-end channels 50 provide a time-base reference for input signals and generate output signals using a time-base reference. The back-end processor 80 (FIG. 3) is coupled to the plurality of front-end channels 50, and controls the operation of the plurality of front-end channels 50 in response to executing instructions received from instruction memory 82 (FIG. 3). Also, CPU 20 is coupled to, and may also control the operation of, the plurality of front-end channels 50. The plurality of inputs and outputs of each of the front-end channels 50 are serially interconnected to allow the plurality of front-end channels 50 to share data and control information and to operate in concert for processing high frequency signals.

The plurality of front-end channels 50 contain a plurality of work channels 54 controlled by pin controlled channel 52. In one embodiment, there is one pin control channel 52 for each eight work channels 54. Also contained in the Front-End 50 are time based control channels (TBCC) 56 and a timer channel (TC) 62. Work channels 54, timer based control channels (TBCC) 56, and Timer Channel (TC) 62 communicate on a timer bus 58. Each pin control channel 52 with its associated work channels 54 communicate on a pin status bus 64. Preferably one or more pin/status buses 64 are used which can be easily partitioned into separate buses or segments for the use of pin control channels 52. Pin/status buses 64 are used to transfer information between channels within the front end 50. Coupled to the plurality of front-end channels is an interrupt bus 66 that provides signals to an interrupt processor 68. Coupling the pin control channel 52, work channel 54, time based control channel 56 and timer channel 62 is a channel data bus 60. This channel data bus 60 is also coupled to a bus interface unit (BIU) 70.

The plurality of front-end channels 50 provide interrupt signals to an interrupt processing circuit 68 on interrupt lines 66. The interrupt processing circuit 68 generates two different outputs; a first output 74 is an input to the back end processor 80, a second output 76 is part of the Inter-Module or peripheral bus (IMB) 32. Interrupt processing circuit 68 is used to indicate whether an interrupt is to be directed to one or both of the back-end processor 80 and the CPU 20. Also, interrupt processing circuit 68 allows CPU 20 to generate interrupts to back-end processor 80. Interrupt processing circuit 68 is software programmed to route certain interrupts over lines 74 to back end 80 and the others to the IMB 32. Preferably a single software program mask register is used to distinguish between the two output interrupt signals 74 and 76. Alternatively, two mask registers can be utilized; one for output line 74, one for output line 76. This allows routing of interrupt signals 66 to either signal line 74, or line 76, or both, or neither.

A significant amount of the I/O processing required by complex real-time control systems involves the same types of timer functions. Thus a relatively small library of channels can be combined in different ways to form a variety of front-end channel configurations which meet the requirements of most customers.

In one embodiment of the present invention, the library of channels includes several different categories or types of channels, namely "work channels", "timebase channels", and "other channels". This category name allows channels with similar functionality or structure to be grouped together. "Work channels" include channels which perform typical timer functions, such as capturing an input value when a time event occurs, providing a signal when a match event occurs, and counting. Work channels also include channels which form more complex combinations of basic timer functions. For example, a channel which performs both matching and counter functions may count the number of match events and only provide a signal after a predetermined number of match events have occurred.

Work channels include: (1) a capture channel; (2) a match channel; and (3) a counter channel. Timebase channels include: (1) a timer bus control channel 56 for providing either master or slave control of a timer bus; (2) a degree clock channel (DC) for providing a degree timebase; and (3) a timer channel 62 for providing a timebase which can be generated either internally or externally. Note that in one embodiment of the present invention, the timer channel 62 can be controlled (e.g. clocked, have a modulus value loaded, or have directionality of count determined) by one or more work channels or by one or more external signals. The other channels include: (1) a synchronous serial channel (not shown) for performing serial transfers; (2) an asynchronous serial channel (not shown) for performing serial transfers; and (3) a pin control channel (PCC) 52 for interfacing work channels 54 and integrated circuit pins.

Note that the serial channels may have direct control over one or more corresponding integrated circuit pins, or may alternately make used of the corresponding integrated circuit pins by way of a pin control channel.

Each work channel provides many programmable features which includes input and output events. The source of input events can be integrated circuit pins or other work channels, whereas an output event can affect integrated circuit pins or other work channels. Channel operations, such as input capture and data transfers between adjacent work channels, can be controlled by input events. Conversely, a work channel's output event, or an integrated circuit pin, can affect operation of work channels and data transfer between work channels. Another feature of each work channel is a selectable configuration mode which defines the work channel operation to be performed for input events or operation which results in output events. These and other features enable the work channels to be programmed to operate together to accomplish a wide range of I/O functions.

The channels included in the library of channels can be added in various combinations to create different versions of front-end channel configurations. Alternate embodiments of the present invention may have more, fewer, or different channels in the library of channels which is used to form front-end channels 50. By using a modular architecture and a flexible library of modular channels, the I/O requirements of a wide variety of customers can be met in a fast and efficient manner.

FIG. 3 is a block diagram that illustrates the remainder of the I/O Signal Processors 38 and 39. BIU 70 is coupled via internal processor bus 72 to a back end processor 80, instruction memory 82, and data memory 84. BIU 70 allows bidirectional communications between the plurality of front-end channels 50, back-end processor 80, and to the IMB 32. Interrupt processing unit 68 is coupled to back end processor 80 via interrupt lines 74. Back-end processor 80 is also preferably directly connected to instruction memory 82 and data memory 84 via internal dedicated buses. Coupled between back-end processor 80 and instruction memory 82 is a dedicated instruction bus, and coupled between back-end processor 80 and data memory 84 is a dedicated data bus. Data memory 84 is a storage unit, such as an SRAM, for storing instructions and/or data to be used by back-end processor 80. BIU 70 is coupled between the IOSPs 38 and 39 and the peripheral bus IMB 32. BIU 70 is for allowing IOSPs 38 and 39 access to IMB 32 for accessing data memory 84. Finally, back end processor 80 is coupled via visibility bus 40 to MUX 42 (see FIG. 1).

Visibility bus 40 is for providing visibility of the internal registers 92 of back-end processor 80 for programming and development of the instructions used by the back-end processor 80. Using a separate visibility bus allows visibility to be provided independent of central processing unit 20. Instruction memory 82 provides storage for the instructions used by back-end processor 80. MUX 42 (FIG. 1) has a first plurality of input/output terminals coupled to a plurality of input/output terminals of the plurality of front-end channels 50 via channel data bus 60, a second plurality of input/output terminals coupled to visibility bus 40, and a third plurality of input/output terminals for providing visibility to the external world via I/O terminals 44. MUX 42 couples either the first or the second plurality of input/output terminals to the third plurality of input/output terminals (I/O terminals 44), for allowing output terminals of the data processing system to be shared by the visibility bus 40.

Figure 4:
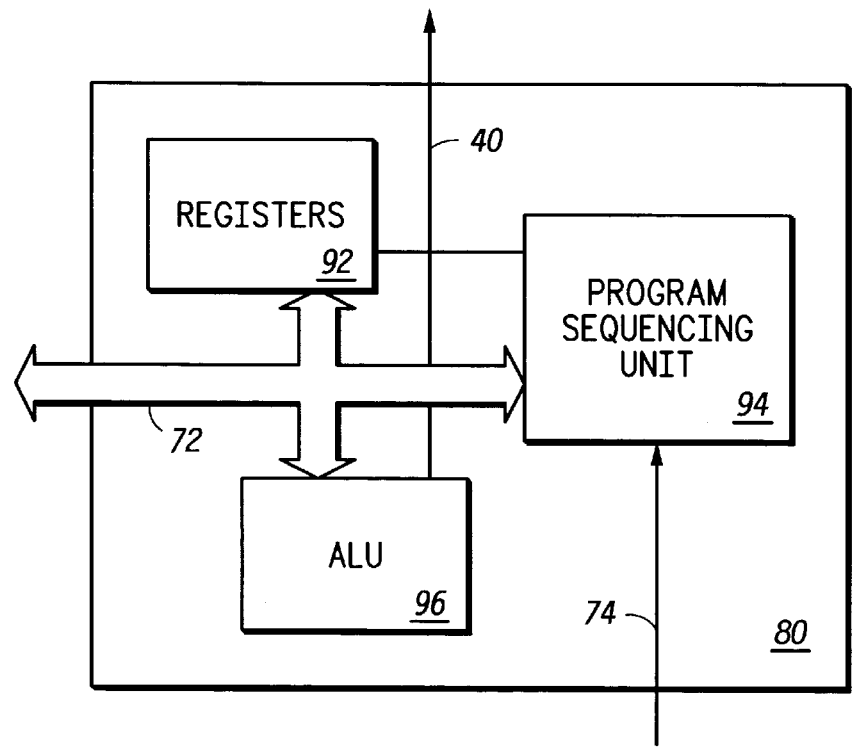
FIG. 4 is a block diagram of a back end processor from FIG. 3.

FIG. 4 is a block diagram of back end processor 80. It can be a general purpose CPU that contains registers 92, a Program Sequencing Unit 94, and an Arithmetic Logical Unit (ALU) 96 coupled together by internal processor bus 72 and by Visibility Bus 40. Also shown in FIG. 4 are interrupt lines 74 that provide interrupt signals from Interrupt Processing Unit 68 to the Program Sequencing Unit 94.

Visibility of IOSPs 38 and 39 on external data buses 28 is not practical because it would seriously impact the performance of CPU 20. Also, providing visibility of IOSPs 38 and 39 would increase the complexity of an I/O chip design. Visibility Bus 40 provides this functionality by supporting multiple IOSPs, such as IOSPs 38 and 39, with arbitration, providing non-real time op code tracking using post analysis, op code tracking, and data visibility. The op code tracking includes instruction start indications, change of flow taken and not taken indications, and change of flow address indications. Note that the change of flow address indication is multiplexed out. For data visibility, parameters can be reported such as write in indication, address indication and data indication.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

What is claimed is:

1. A data processing system, comprising:

a central processing unit for executing first instructions;

a peripheral bus, coupled to the central processing unit; and an input/output coprocessor, coupled to the peripheral bus, the input/output coprocessor comprising a plurality of front-end channels having a plurality of input/output terminals, the plurality of front-end channels for receiving a time-base value, and in response, for providing a time-base reference for input signals and for generating output signals using the time-base reference, wherein the time-base value is used by the plurality of front-end channels to implement a timer function;

a back-end processor, coupled to the plurality of front-end channels, for controlling operation of the plurality of front-end channels in response to executing second instructions, wherein the second instructions are different than the first instructions;

a visibility bus, coupled to the back-end processor, for providing visibility of internal registers of the back-end processor for development of the second instructions, wherein the visibility is provided independent of the central processing unit; and a storage unit, coupled to the back-end processor, for storing the second instructions.

2. The data processing system of claim 1, further comprising a second input/output coprocessor, coupled to the peripheral bus and to the visibility bus.

3. The data processing system of claim 1, further comprising: a multiplexer having a first plurality of input/output terminals coupled to the plurality of input/output terminals of the plurality of front-end channels, a second plurality of input/output terminals coupled to the visibility bus, and a third plurality of input/output terminals, the multiplexer for coupling either the first or the second plurality of input/output terminals to the third plurality of input/output terminals, for allowing output terminals of the data processing system to be shared.

4. The data processing system of claim 1, further comprising:

a bus interface unit coupled between the plurality of front-end channels and the back-end processor, and for coupling the input/output coprocessor to the peripheral bus, for allowing the central processing unit access to the plurality of front-end channels.

5. The data processing system claim 1, further comprising:

a second storage unit coupled to the peripheral bus, the second storage unit for storing instructions and/or data.

6. The data processing system of claim 5, wherein:

the input/output coprocessor further comprises a bus interface unit, coupled between the input/output signal coprocessor and the peripheral bus, wherein the bus interface unit is for allowing the input/output coprocessor access to the peripheral bus for accessing the second storage unit.

7. The data processing system of claim 1, wherein the storage unit is coupled to the back-end processor via a dedicated instruction bus.

8. The data processing system of claim 1, further comprising:

an interrupt processing circuit to indicate whether an interrupt is to be directed to one or both of the back-end processor and the central processing unit.

9. A data processing system, comprising:

a central processing unit for executing first instructions;

a peripheral bus, coupled to the central processing unit; and an input/output signal coprocessor, coupled to the peripheral bus, the input/output signal coprocessor, comprising a plurality of front-end channels having a plurality of input/output terminals, the plurality of front-end channels for receiving a time-base value, and in response, for providing a time-base reference for input signals and for generating output signals using the time-base reference, wherein the time-base value is used by the plurality of front-end channels to implement a timer function;

a back-end processor for controlling operation of the plurality of front-end channels in response to executing second instructions, wherein the second instructions are different than the first instructions;

a bus interface unit, coupled to the plurality of front-end channels, to the back-end processor, and to the peripheral bus, for allowing bidirectional communications between the plurality of front-end channels, the back-end processor, and to the peripheral bus;

a visibility bus, coupled to the back-end processor, for providing visibility of internal registers of the back-end processor for program development of the second instructions, wherein the visibility is provided independent of the central processing unit; and a storage unit, coupled to the back-end processor, for storing the second instructions.

10. The data processing system of claim 9, further comprising a second input/output signal coprocessor, coupled to the peripheral bus and to the visibility bus.

11. The data processing system of claim 9, further comprising: a multiplexer having a first plurality of input/output terminals coupled to the plurality of input/output terminals of the plurality of front-end channels, a second plurality of input/output terminals coupled to the visibility bus, and a third plurality of input/output terminals, the multiplexer for coupling either the first or the second plurality of input/output terminals to the third plurality of input/output terminals, for allowing output terminals of the data processing to be shared.

12. The data processing system of claim 9, further comprising an interrupt processing circuit for allowing the central processing unit to generate interrupts to the back-end processor.

13. The data processing system claim 9, further comprising:

a second storage unit coupled to the peripheral bus, the second storage unit for storing instructions and/or data.

14. The data processing system of claim 9, wherein the storage unit is coupled to the back-end processor via a dedicated instruction bus.

15. The data processing system of claim 9, further comprising:

an interrupt processing circuit to indicate whether an interrupt is to be directed to one or both of the back-end processor and the central processing unit.

16. The data processing system of claim 15, wherein the interrupt processing circuit is for allowing the central processing unit to generate interrupts to the back-end processor.

17. A data processing system having a central processing unit, an input/output coprocessor, and a peripheral bus for coupling the input/output coprocessor to the central processing unit, the input/output coprocessor comprising:

a plurality of front-end timer channels having a plurality of input/output terminals, each of the plurality of front-end timer channels for receiving a time-base value, and in response, providing a timer function;

a back-end processor for controlling operation of the plurality of front-end timer channels in response to executing instructions, wherein instructions executed by the back-end processor are different than instructions executed by the central processing unit;

a bus interface unit, coupled to the plurality of front-end timer channels, to the back-end processor, and to the peripheral bus, for allowing bidirectional communications between the plurality of front-end timer channels, the back-end processor, and to the peripheral bus;

a visibility bus, coupled to the back-end processor, for providing visibility of internal registers of the back-end processor for instruction programming development, wherein the visibility is provided independent of the central processing unit; and a storage unit, coupled to the back-end processor via a dedicated bus, the storage unit for storing the instructions.

18. The data processing system of claim 17, wherein each of the plurality of front-end timer channels comprises a plurality of inputs and a plurality of outputs, wherein the plurality of inputs and outputs of each of the plurality of front-end timer channels are serially interconnected to allow the plurality of front-end timer channels to share data and control information and to operate in concert for processing high frequency signals.

19. The data processing system of claim 17, further comprising:

an interrupt processing circuit to indicate whether an interrupt is to be directed to one or both of the back-end processor and the central processing unit.

20. The data processing system of claim 19, wherein the interrupt processing circuit allows the central processing unit to generate interrupts to the back-end processor.

21. The data processing system of claim 19, wherein the interrupt processing is characterized as being a software program mask.

* * * * *